(12) United States Patent
Wivinis

(10) Patent No.: US 7,731,256 B1
(45) Date of Patent: Jun. 8, 2010

(54) RECREATIONAL VEHICLE SLIDE OUT SYSTEM

(76) Inventor: Gerald P. Wivinis, 47888 US Hwy. 18, Canton, SD (US) 57013

( * ) Notice: Subject to any disclaimer, the term of this patent is extended or adjusted under 35 U.S.C. 154(b) by 0 days.

(21) Appl. No.: 12/243,357

(22) Filed: Oct. 1, 2008

(51) Int. Cl.
*B60P 3/34* (2006.01)

(52) U.S. Cl. .................. 296/26.01; 296/171; 296/26.12; 296/26.13

(58) Field of Classification Search .................. 296/165, 296/171, 172, 173, 175, 176, 26.01, 26.02, 296/26.03, 26.12, 26.13, 26.14, 26.15; 52/65, 52/67

See application file for complete search history.

(56) References Cited

U.S. PATENT DOCUMENTS

| 2,137,290 | A | * | 11/1938 | Huckstep et al. ................ 52/71 |
| 2,395,691 | A | | 2/1946 | Smith |
| 2,568,009 | A | | 9/1951 | Johnson |
| 3,257,760 | A | * | 6/1966 | Calthorpe ....................... 52/68 |
| 3,778,100 | A | * | 12/1973 | Dillard ........................ 296/164 |
| 3,792,557 | A | * | 2/1974 | Pitts .............................. 52/65 |
| 3,811,723 | A | | 5/1974 | Anderson |
| 4,557,518 | A | * | 12/1985 | Maclean et al. ............. 296/156 |
| 4,912,892 | A | * | 4/1990 | Jurgensen ....................... 52/69 |
| 5,248,180 | A | | 9/1993 | Hussaini |
| 5,345,730 | A | * | 9/1994 | Jurgensen ....................... 52/64 |
| 5,983,576 | A | * | 11/1999 | Hanser et al. ................... 52/67 |
| 6,250,701 | B1 | * | 6/2001 | Vance ....................... 296/26.01 |
| 6,560,937 | B1 | * | 5/2003 | Gardner et al. ................ 52/201 |
| 6,623,058 | B1 | * | 9/2003 | Crean ....................... 296/26.13 |
| 6,729,670 | B1 | | 5/2004 | Buls et al. |
| 6,983,567 | B2 | | 1/2006 | Ciotti |
| 7,100,967 | B2 | | 9/2006 | Shea |

* cited by examiner

*Primary Examiner*—Glenn Dayoan
*Assistant Examiner*—Gregory Blankenship

(57) ABSTRACT

A recreational vehicle slide out system includes a mobile dwelling assembly with an outer wall having an opening extending therethrough. An extension is slidably mounted to the dwelling assembly. The extension includes an upper wall, a lower wall and an exterior wall. The exterior wall forms a covering for the opening when the extension is in a stored position. A lateral wall includes a first side edge and a second side edge. The first side edge is hingedly coupled to a lateral edge of the exterior wall. The lateral wall is pivotable into a closed position extending between the exterior wall and the outer wall when the extension is in an extended position. The lateral wall is pivoted to a position approximately orientated parallel to the exterior wall when the extension is in the stored position to prevent the lateral walls from substantially extending into the mobile dwelling assembly.

3 Claims, 6 Drawing Sheets

RECREATIONAL VEHICLE SLIDE OUT SYSTEM

BACKGROUND OF THE INVENTION

Field of the Invention

The present invention relates to vehicle slide devices and more particularly pertains to a new vehicle slide device for increasing the livable area of a recreational vehicle or trailer by including slide out portions which include foldable side walls to prevent the side walls from extending into the recreational vehicle when the slide outs are not being used.

SUMMARY OF THE INVENTION

An embodiment of present invention meets the needs presented above by generally comprising a mobile dwelling assembly that includes an outer wall, a top wall and a bottom wall. The outer wall extends between the top and bottom walls and the outer wall has an opening extending therethrough. An extension is slidably mounted to the dwelling assembly and forms a covering for the opening. The extension includes an upper wall, a lower wall and an exterior wall extending between the upper and lower walls. The upper and lower walls are slidably coupled to the dwelling assembly to allow the exterior wall to move toward or away from the outer wall. The exterior wall forms a covering for the opening when the extension is in a stored position fully retracted into the dwelling assembly. The upper wall defines a roof and the lower wall a floor of a compartment formed by the extension when the extension is in a deployed position fully extending outwardly away from the dwelling assembly. A lateral wall includes an upper edge, a lower edge, a first side edge and a second side edge. The first side edge is hingedly coupled to a lateral edge of the exterior wall. The lateral wall is pivotable into a closed position extending between the exterior wall and the outer wall when the extension is in the extended position. The lateral wall is pivoted to a position approximately orientated parallel to the exterior wall when the extension is in the stored position to prevent the lateral walls from substantially extending into the mobile dwelling assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
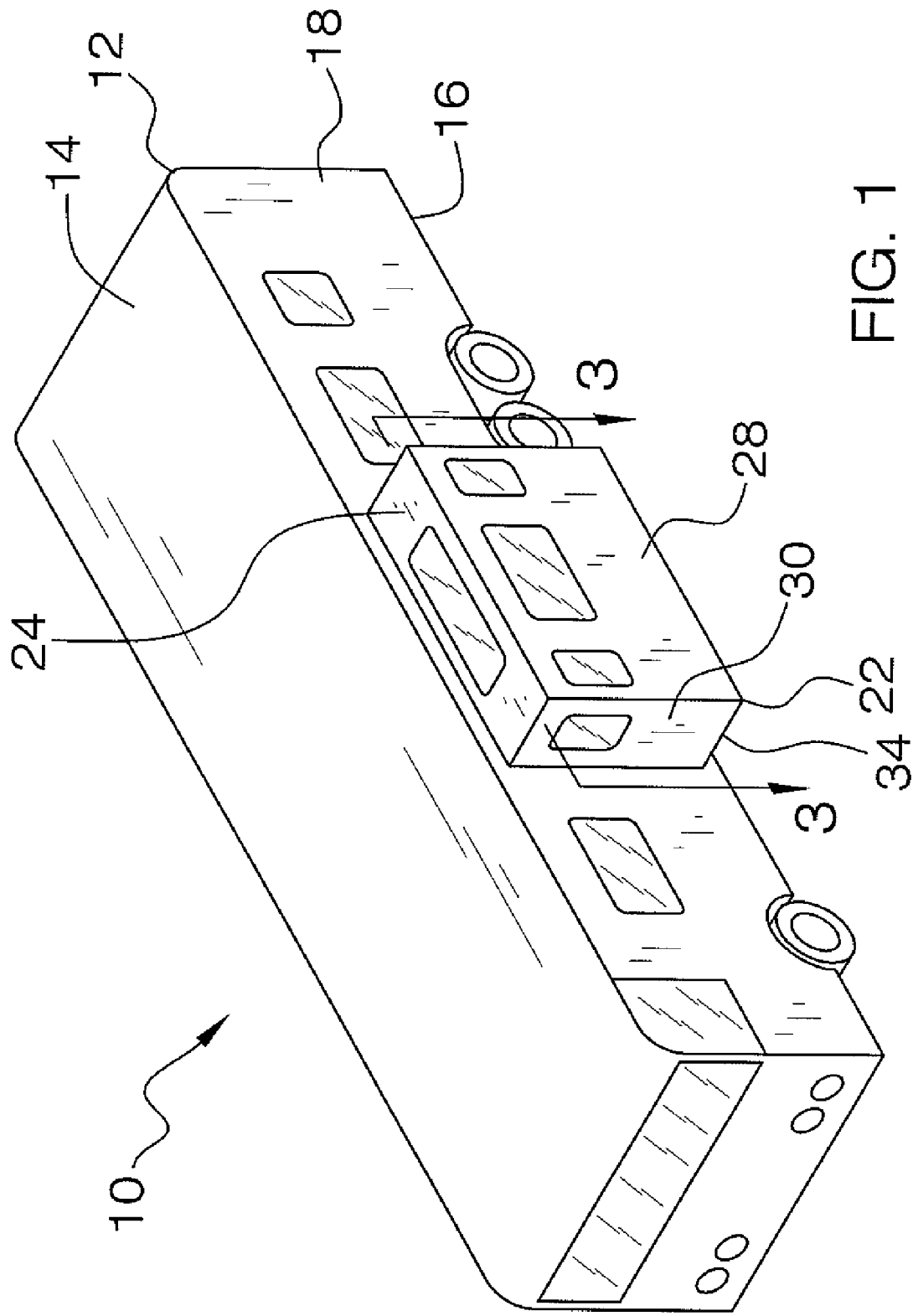
FIG. 1 is a top perspective view of a recreational vehicle slide out system according to an embodiment of the present invention.
Figure 2:
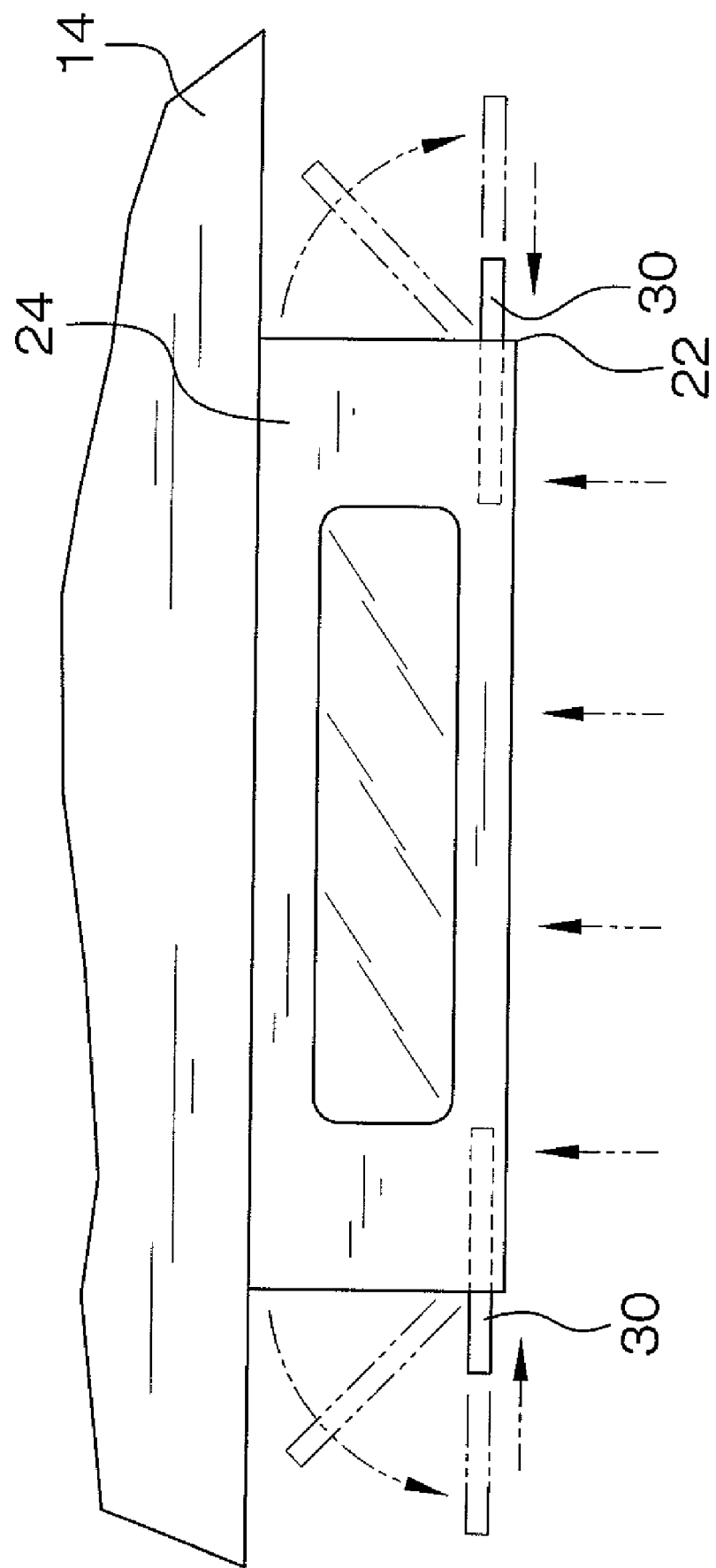
FIG. 2 is a top view of an embodiment of the present invention.
Figure 3A:
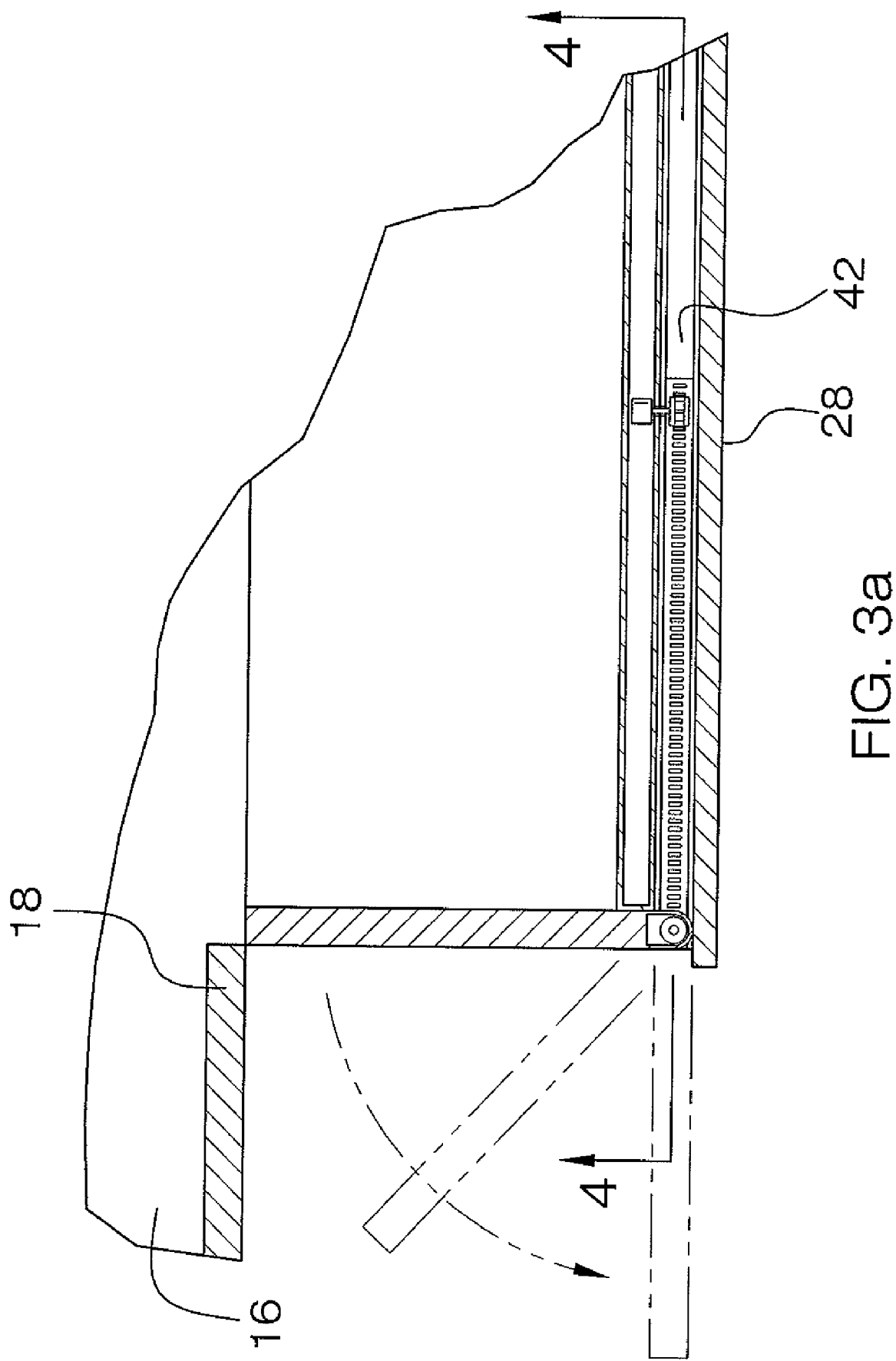
FIG. 3a is a cross-sectional view of an embodiment of the present invention taken along line 3-3 of FIG. 1.
Figure 3B:
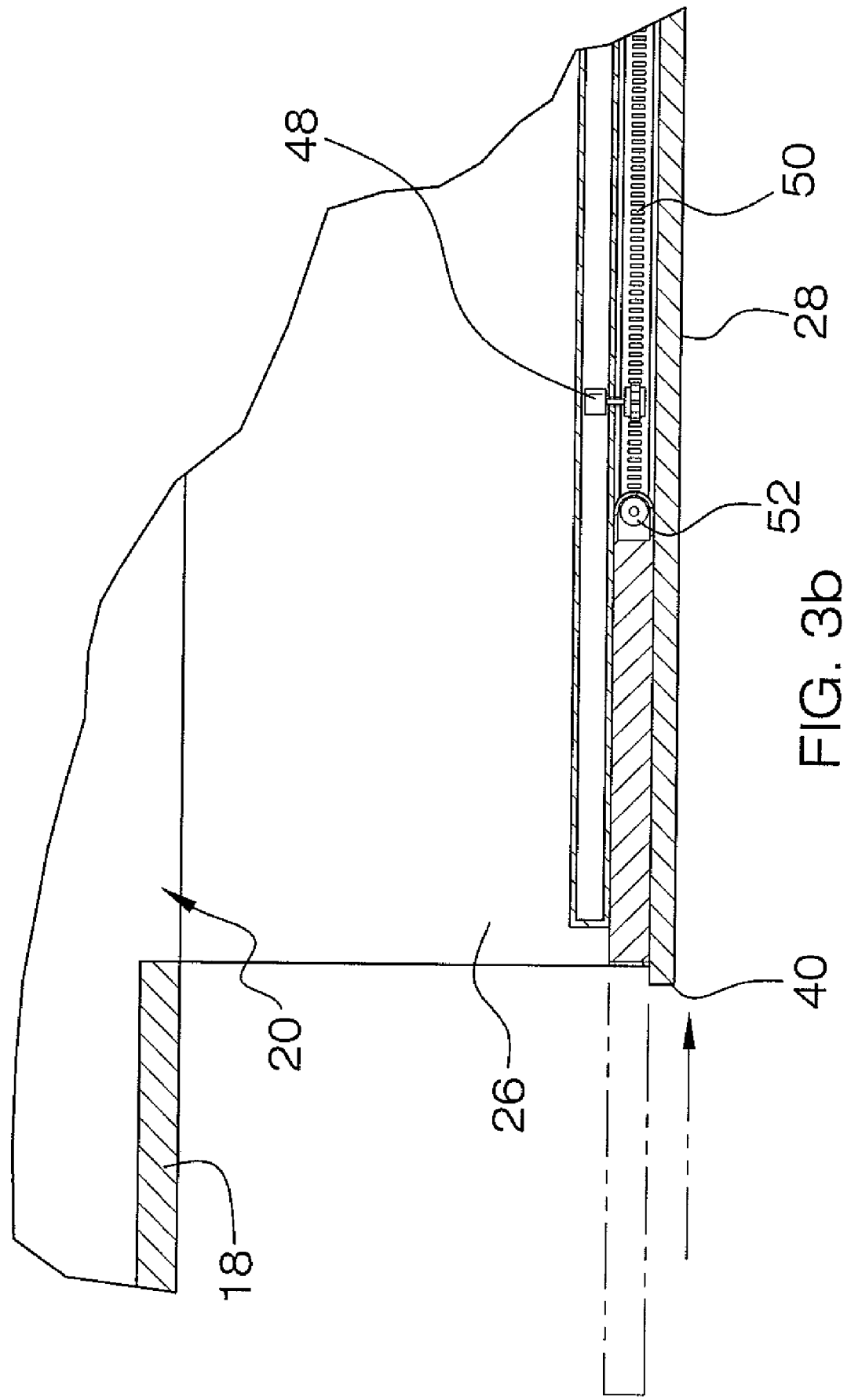
FIG. 3b is a cross-sectional view of an embodiment of the present invention taken along line 3-3 of FIG. 1 showing a lateral wall in a stored position.
Figure 4A:
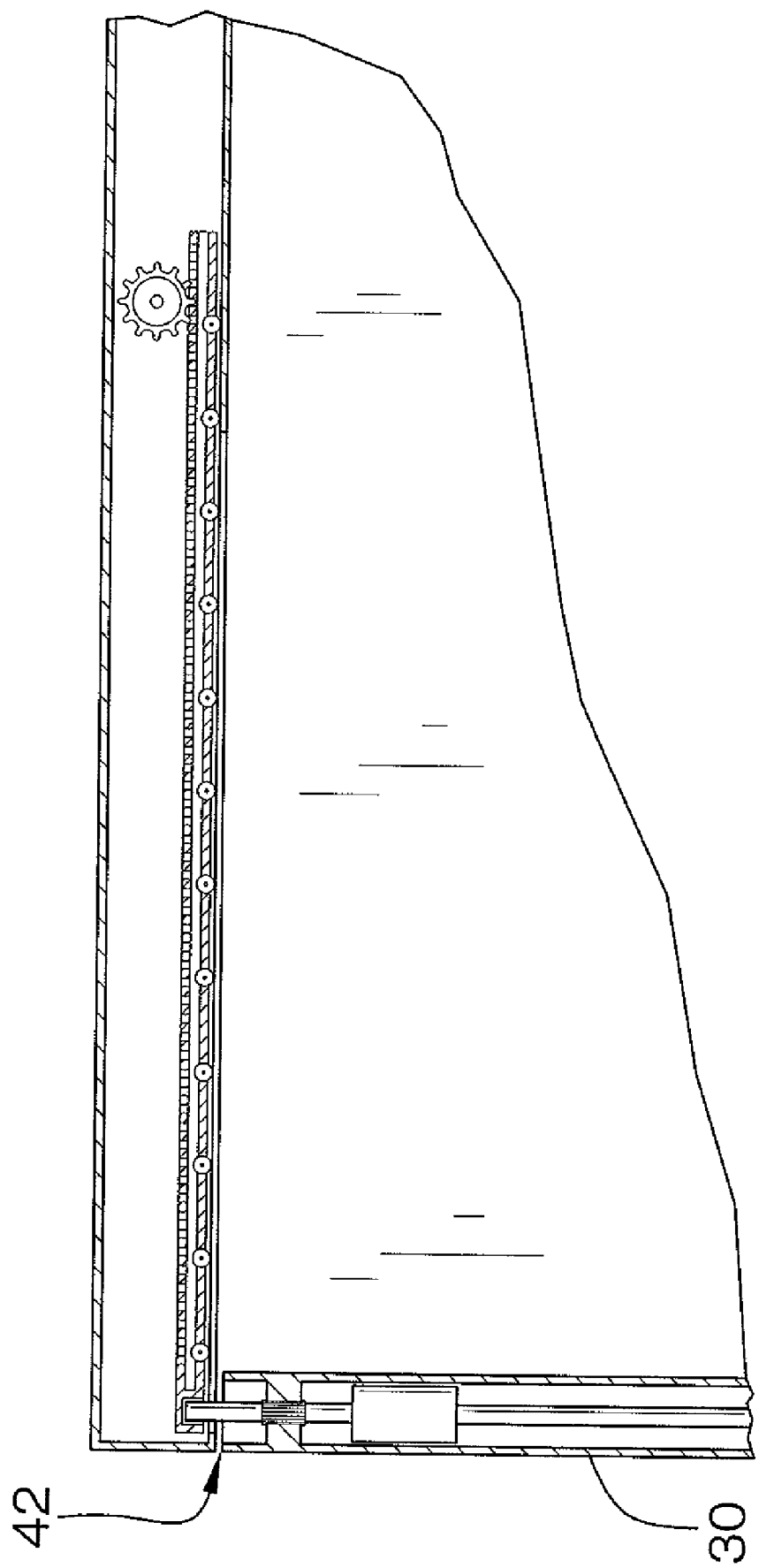
FIG. 4a is a cross-sectional view taken along line 4-4 of FIG. 3a of an embodiment of the present invention.
Figure 4B:
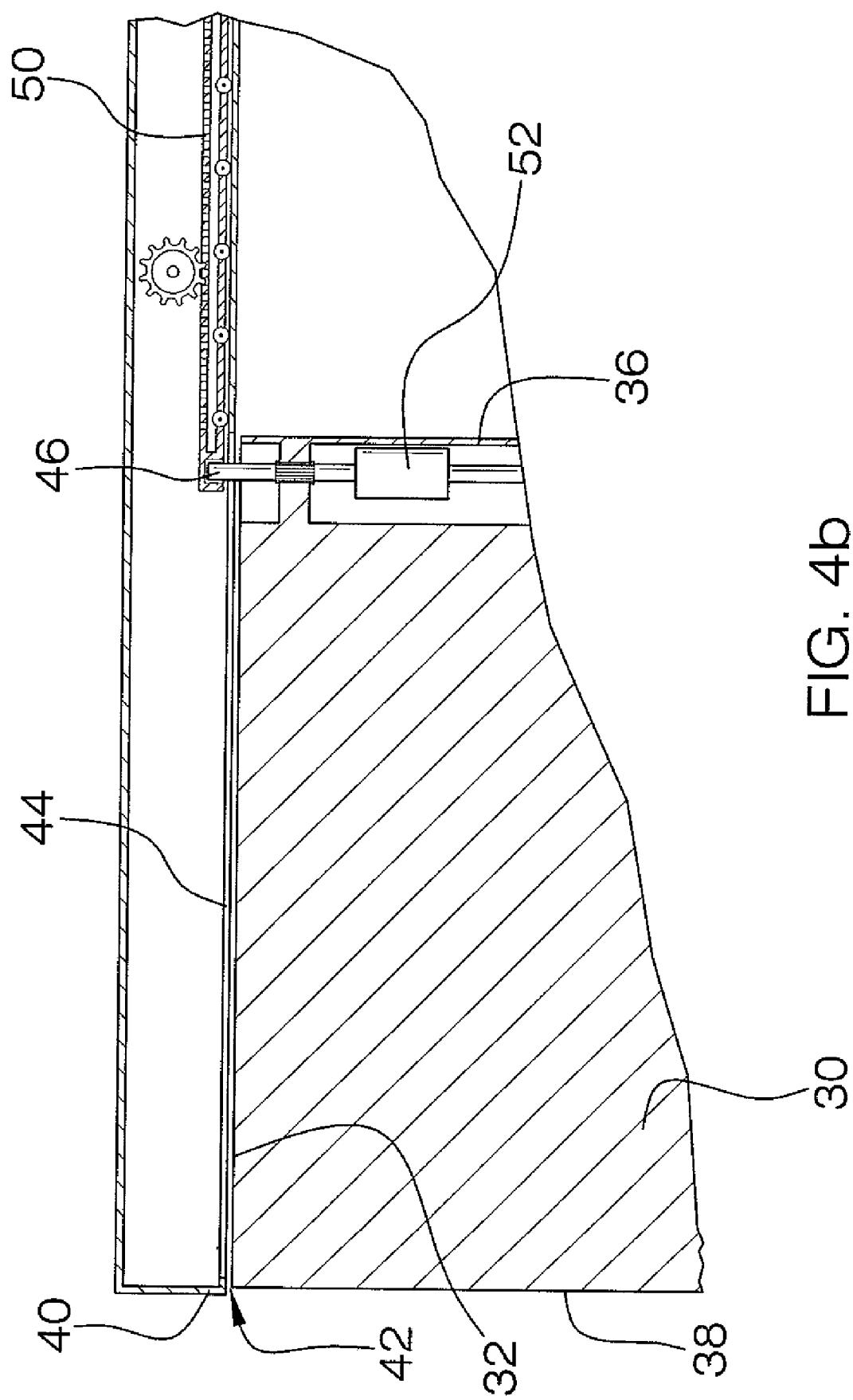
FIG. 4b is a cross-sectional view along line 4-4 of FIG. 3a of an embodiment of the present invention showing the lateral wall in the stored position.

With reference now to the drawings, and in particular to FIGS. 1 through 4 thereof, a new vehicle slide device embodying the principles and concepts of an embodiment of the invention and generally designated by the reference numeral 10 will be described.

As best illustrated in FIGS. 1 through 4, the recreational vehicle slide out system 10 generally comprises a conventional mobile dwelling assembly 12 that includes an outer wall 18, a top wall 14 and a bottom wall 16. The outer wall 18 extends between the top 14 and bottom 16 walls. The outer wall 18 has an opening 20 extending therethrough. The mobile dwelling assembly 12 may include any conventional recreational vehicle or trailer pulled by another vehicle and which may be used as living quarters, an operation center, and the like.

An extension 22 is slidably mounted to the dwelling assembly 12 and forming a covering for the opening 20. The extension 22 is a modified version of a conventional "slide" which is used to increase the usable area within the mobile dwelling assembly 12 by extending the slide outwardly from the assembly 12. A conventional slide is typically a solid box of fixed walls having an opening therein directed toward the interior of the assembly 12 and which includes side walls that extend into the assembly 12 when the slide is retracted into the assembly 12.

The extension 22 of an embodiment of the system 10 is modified and includes an upper wall 24, a lower wall 26 and an exterior wall 28 extending between the upper 24 and lower 26 walls. The upper 24 and lower 26 walls are slidably coupled to the dwelling assembly 12 to allow the exterior wall 28 to move toward or away from the outer wall 18. The exterior wall 28 forms a covering for the opening 20 when the extension 22 is in a stored position fully retracted into the dwelling assembly 12. The upper wall 24 defines a roof and the lower wall a floor of a compartment formed by the extension 22 when the extension 22 is in a deployed position fully extending outwardly away from the assembly 12. The connections and movements of the upper 24 and lower 26 walls with the assembly 12 are conventional with respect to recreational vehicles and simply slide into or against corresponding ones of the top 14 and bottom 16 walls.

The extension 22 further includes a pair of lateral walls 30. Each of the lateral walls 30 includes an upper edge 32, a lower edge 34, a first side edge 36 and a second side edge 38. Each of the lateral walls 30 is hingedly coupled to one of a pair of lateral edges 40 of the exterior wall 28 adjacent to an associated one of the first side edges 36. The lateral walls 30 are pivotable into a closed position extending between the exterior wall 28 and the outer wall 18 when the extension 22 is in the extended position. The lateral walls 30 are pivoted to a position approximately orientated parallel to the exterior wall 28 when the extension 22 is in the stored position to prevent the lateral walls 30 from substantially extending into the mobile dwelling assembly 12. By approximately orientated parallel is meant that a plane of the lateral walls 30 form an angle with respect a plane of the exterior wall 28 between 0 degrees and 10 degrees. By "substantially extending" is meant less than 12 inches into the assembly 12. In certain instances, depending on the position of the extension 22, it may be possible to utilize only a single pivotally coupled lateral wall 30 and one fixed lateral wall (not shown). This may occur where the fixed wall is adjacent to a rear wall of the assembly 12 or adjacent to an inner dividing wall of the assembly 12.

Each of the lateral edges 40 of the exterior wall 28 has a slot 42 therein. The lateral walls 30 are removably extended into one of the slots 42 when the extension is in the stored position. The slots 42 form a housing within the exterior wall 28 to hold the lateral walls 30 when the extension 22 is in the stored position so that they do protrude into the assembly 12 and interfere with the usable space within the assembly 12. In one embodiment, guide rails 44 may be positioned within the slots 42 and each has a pivot member 46 pivotally and slidably or movably mounted thereto. The pivot members 46 are attached adjacent to the first side edge 36 of the lateral walls 30 to allow the lateral walls 30 to pivot with respect to the exterior wall 28. The pivot members 46 are slidable or movable along the guide rail 44 and inward of the slots 42 to slide or move the lateral walls 30 into the slots 42.

It should be understood that the movement of the upper 24 and lower 26 walls and the movements of the lateral walls 30 may be accomplished by hand or by motorized means using conventional and well known structures and methods. As shown in the Figures, one embodiment utilizes an electric motor 48 to pull a bracket 50, attached to the pivot member 46, along the guide rail 44 and into the slot 42. A second motor 52 may be mounted to the pivot member 46 to pivot the lateral wall 30 as needed. These may be synchronized with one or more motors used to move the extension 22 inward or outward of the assembly so that as the extension 22 is moved from the stored position to the deployed position, the lateral walls 30 are extended outwardly of the exterior wall 28 and then pivoted to close gaps between the exterior wall 28 and the outer wall 18.

Sealing means, such as inflatable bladders, may be used along the second 38, top 32 and bottom 34 edges of the lateral walls 30 to form a seal around the lateral walls 30. The extension 22 may also be extended outwardly fully until the lateral walls 30 extend toward the outer wall 18 and the extension 22 then moved toward the outer wall 18 to form a tight fit between the lateral walls 30 and the outer wall 18. When the extension 22 is not needed, the reverse action is undertaken wherein the lateral walls 30 are pivoted and slid into the exterior wall 28 while the extension 22 is slid back into the assembly 12. Because the lateral walls 30 do not extend into the assembly 12, they do not interfere with movement within and usage of the assembly 12 when the extension 22 is in the stored position and extensions 22 may be used which extend further from the outer wall 18 than have been previously been available.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slide out compartment system comprising:
a mobile dwelling assembly including an outer wall, a top wall and a bottom wall, said outer wall extending between said top and bottom walls, said outer wall having an opening extending therethrough;
an extension being slidably mounted to said dwelling assembly and forming a covering for said opening, said extension including;
an upper wall;
a lower wall;
an exterior wall extending between said upper and lower walls, said upper and lower walls being slidably coupled to said dwelling assembly to allow said exterior wall to move toward or away from said outer wall, said exterior wall forming a covering for said opening when said extension is in a stored position fully retracted into said dwelling assembly, said upper wall defining a roof and said lower wall a floor of a compartment formed by said extension when said extension is in a deployed position fully extending outwardly away from said dwelling assembly;
a lateral wall including an upper edge, a lower edge, a first side edge and a second side edge, said first side edge being hingedly coupled to a lateral edge of said exterior wall, said lateral wall being pivotable into a closed position extending between said exterior wall and said outer wall when said extension is in said extended position, said lateral wall being pivoted to a position approximately orientated parallel to said exterior wall when said extension is in a stored position to prevent said lateral wall from substantially extending into said mobile dwelling assembly; and
said lateral edge of said exterior wall having a slot therein, said lateral wall being removably extended into said slot when said extension is in said stored position.

2. The system according to claim 1, further including a guide rail being positioned within said slot, a pivot member being pivotable with respect to said guide rail and being slidably mounted to said guide rail, said pivot member being attached to said lateral wall to allow said lateral wall to pivot with respect to said exterior wall, said pivot member being slidable along said guide rail and inward of said slot to slide said lateral wall into said slot.

3. A slide out compartment system comprising:
a mobile dwelling assembly including an outer wall, a top wall and a bottom wall, said outer wall extending between said top and bottom walls, said outer wall having an opening extending therethrough;
an extension being slidably mounted to said dwelling assembly and forming a covering for said opening, said extension including;
an upper wall;
a lower wall;
an exterior wall extending between said upper and lower walls, said upper and lower walls being slidably coupled to said dwelling assembly to allow said exterior wall to move toward or away from said outer wall, said exterior wall forming a covering for said opening when said extension is in a stored position fully retracted into said dwelling assembly, said upper wall defining a roof and said lower wall a floor of a compartment formed by said extension when said extension is in a deployed position fully extending outwardly away from said dwelling assembly;

a pair of lateral walls, each of said lateral walls including an upper edge, a lower edge, a first side edge and a second side edge, each of said lateral walls being hingedly coupled to one of a pair of lateral edges of said exterior wall adjacent to an associated one of said first side edges, said lateral walls being pivotable into a closed position extending between said exterior wall and said outer wall when said extension is in said extended position, said lateral walls being pivoted to a position approximately orientated parallel to said exterior wall when said extension is in said stored position to prevent said lateral walls from substantially extending into said mobile dwelling assembly; and each of said lateral edges of said exterior wall having a slot therein, each of said lateral walls being removably extended into one of said slots when said extension is in said stored position.

* * * * *